(12) United States Patent
Maahs

(10) Patent No.: US 6,608,288 B2
(45) Date of Patent: Aug. 19, 2003

(54) OVEN CHAMBER HAVING A PASS-THROUGH DESIGN

(75) Inventor: Jerry D. Maahs, Brookfield, WI (US)

(73) Assignee: Alto-Shaam, Inc., Menomonee Falls, WI (US)

( * ) Notice: Subject to any disclaimer, the term of this patent is extended or adjusted under 35 U.S.C. 154(b) by 0 days.

(21) Appl. No.: 10/078,845

(22) Filed: Feb. 19, 2002

(65) Prior Publication Data

US 2002/0113055 A1 Aug. 22, 2002

Related U.S. Application Data

(60) Provisional application No. 60/270,515, filed on Feb. 21, 2001.

(51) Int. Cl.$^7$ .............................. A21B 1/00; A21B 3/02
(52) U.S. Cl. ................... 219/391; 219/400; 219/401; 219/413; 126/190
(58) Field of Search .................. 219/391, 394, 219/400, 401, 411, 413, 385, 386; 99/342, 474, 467; 126/20, 20.1, 20.2, 21 A

(56) References Cited

U.S. PATENT DOCUMENTS

| | | | | |
|---|---|---|---|---|
| 3,604,895 A | * | 9/1971 | MacKay | 219/401 |
| 4,030,476 A | * | 6/1977 | Hock | 219/400 |
| 4,730,100 A | * | 3/1988 | Pingelton | 219/400 |
| 4,763,638 A | * | 8/1988 | Hurley et al. | 126/21 A |
| 4,851,644 A | * | 7/1989 | Oslin | 219/400 |
| 5,203,255 A | * | 4/1993 | Wells et al. | 126/21 A |
| 5,520,095 A | * | 5/1996 | Huber et al. | 99/342 |
| 5,640,946 A | * | 6/1997 | Oslin | 126/20 |
| 6,153,858 A | * | 11/2000 | Barnes et al. | 219/413 |
| 6,369,362 B1 | * | 4/2002 | Brenn | 219/401 |

\* cited by examiner

*Primary Examiner*—Joseph Pelham
(74) *Attorney, Agent, or Firm*—Quarles & Brady LLP

(57) ABSTRACT

An oven includes an internal preparation chamber defining a cavity that receives and prepares food product therein. The oven further includes a first chef-side door that provides access to the cavity by the chef for the placement of food product to be prepared, and a second server-side door providing access to the chamber by the serving staff to remove the prepared food product.

29 Claims, 3 Drawing Sheets

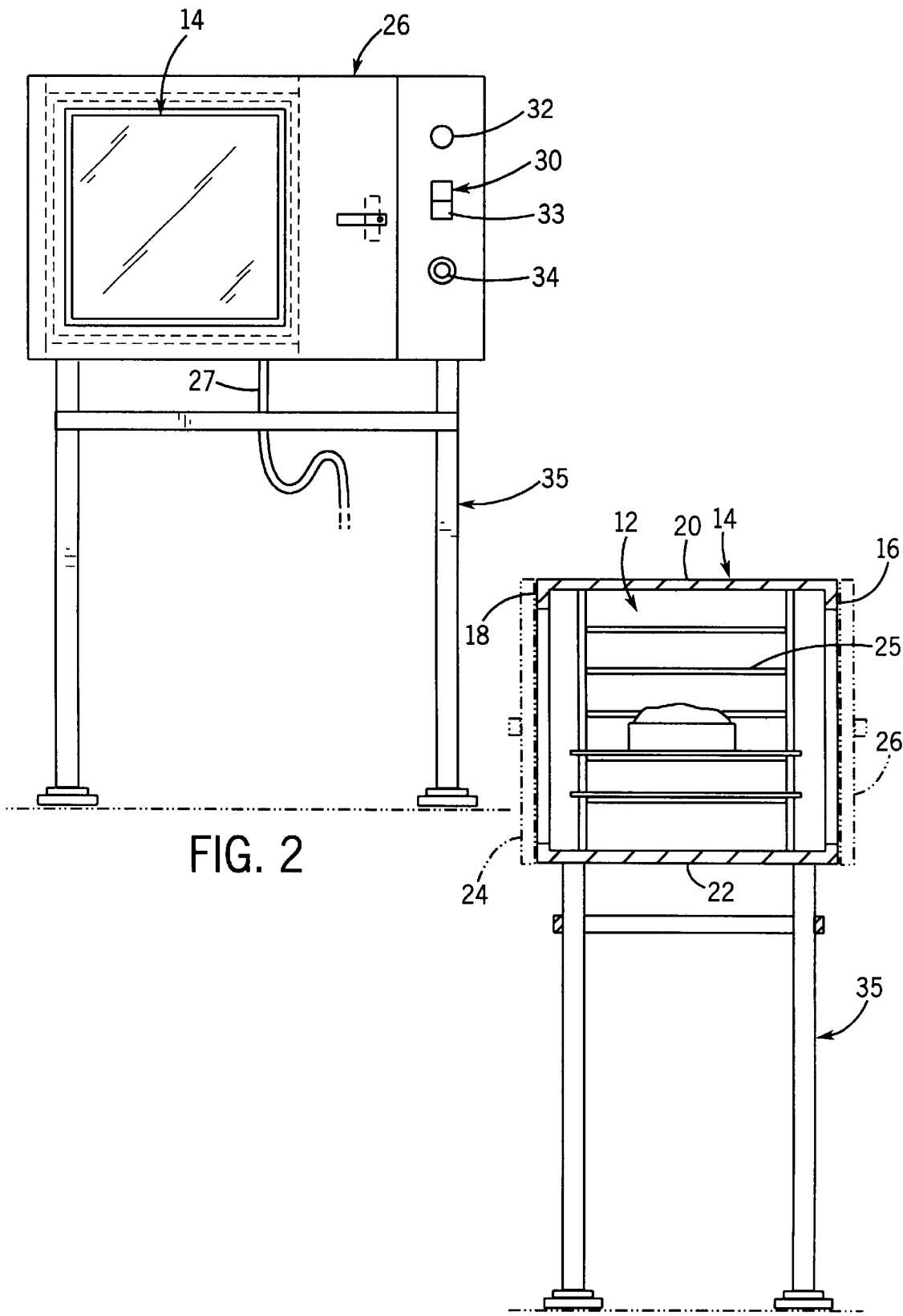

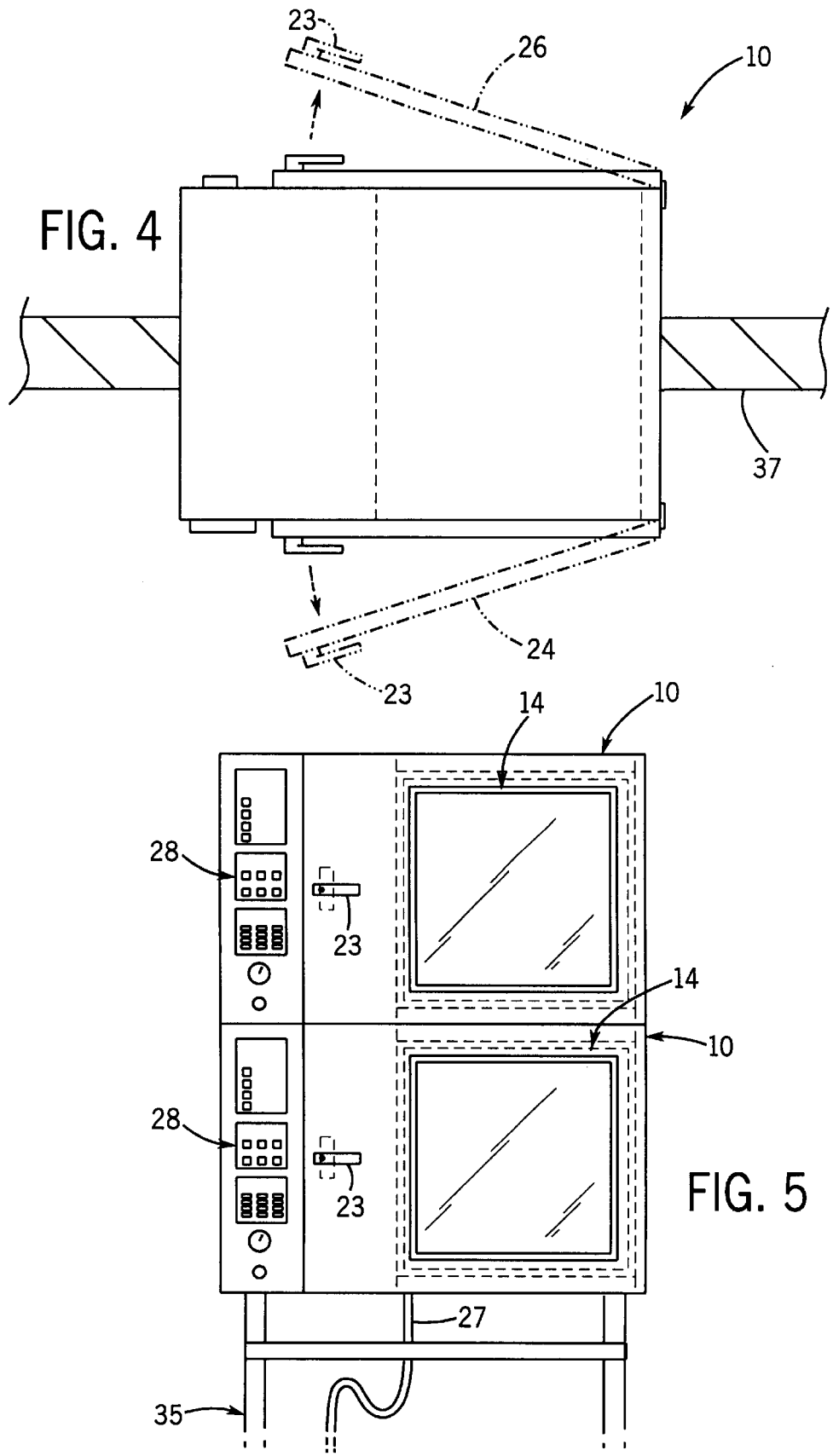

OVEN CHAMBER HAVING A PASS-THROUGH DESIGN

CROSS-REFERENCE TO RELATED APPLICATIONS

The present application claims priority to U.S. patent application Ser. No. 60/270,515, filed on Feb. 21, 2001 and entitled "Oven chamber Having a Pass-Through Design", the disclosure of which is hereby incorporated by reference as if set forth in its entirety herein.

STATEMENT REGARDING FEDERALLY SPONSORED RESEARCH OR DEVELOPMENT

BACKGROUND OF THE INVENTION

1. Field of the Invention

The present invention relates generally to ovens, and in particular, relates to an oven having dual access to provide a pass-through design.

2. Description of the Related Art

Conventional ovens include standard convection ovens, steamers, and combination oven/steamers, such as those commercially available from Alto-Shaam®, Inc, located in Menomomee Falls, Wis. These devices include, in particular, Combitherm® Combination Oven/Steamers available from Alto-Shaam®, Inc., which utilize steam, heated air or a combination of both for steaming, baking, roasting, thawing, reheating, and various other cooking functions. The combination oven/steamer is compact and especially desirable in commercial kitchens that are traditionally limited in space. These devices are commercially available as gas and electric models.

Conventional ovens allow access to the heating cavity via a single door through which uncooked food is delivered and cooked food is removed. As a result, the serving staff must access the cooked food product from the same location as the chef handling raw food product and, more specifically, from the same door. Because most commercial kitchens are busy and cramped, the chef's food preparation efforts may be hindered accessing the oven. In addition, because the chef is in constant contact with potential contaminants associated with the handling of raw food, and especially raw meat products, cooked food product could become contaminated by servers using the same door as the chef.

It has thus become desirable to isolate the chef from contact with the final cooked food product. In fact, some countries have enacted health codes that prohibit chefs from contacting prepared food product that is ready to be served in order to reduce the risk of contamination.

What is therefore needed is an oven whose internal heating cavity may be accessed by the chef at a first location, and by a server at a second location isolated from the first location.

BRIEF SUMMARY OF THE INVENTION

The present invention provides an oven having a pass-through design.

In accordance with one aspect of the invention, the oven includes an oven chamber defining a heating cavity that is configured to receive raw food product therein and utilize cooking elements to produce prepared food product from the raw food product. A first door is disposed at a first access location of the oven and provides access to the cavity for inserting the raw food product therein. A second door is disposed at a second access location, isolated from the first access location, and provides access to the cavity for the removal of the prepared food product therefrom. An indicator is activated when the prepared food product is ready to be removed from the cavity via the second door.

It is thus one object of the invention to provide a pass-through oven that is accessible to a chef and serving staff from remote locations to minimize the risk of cross contamination of prepared food product from raw food product.

In another aspect, the oven includes a set of controls used in combination with the cooking elements to prepare the food product. In one preferred form, the controls automatically activate the indicator upon the termination of a cooking sequence. In another preferred form, the indicator may be manually activated to indicate that the prepared food product may be removed from the oven. In another preferred form, the second door is automatically locked in a closed position until the indicator has been actuated.

It is thus another object of the invention to provide an indicator to a serving staff that prepared food product is ready to be removed from the oven.

In another aspect, a switch, located remotely from the first door, is operable to deactivate the indicator.

It is thus another object to provide a switch that is not easily accessible to the chef for acknowledging that the prepared food may be removed from the oven cavity.

In one preferred form, the first and second doors are located on opposing walls. In one preferred form, the first and second doors are located on adjacent walls. In one preferred form, the first and second doors are located on the same wall.

It is thus another object of the invention to provide various configurations of a pass-through design to isolate raw food product from prepared food product.

In another preferred form, the cooking elements use convection to prepare the raw food product. In one aspect, the cooking elements are gas cooking elements. In another aspect, the cooking elements are electric cooking elements.

It is thus another object of the invention to provide an oven that utilizes conventional convection cooking elements to prepare the food product.

In another preferred form, the cooking elements produce steam to prepare the food product. A drain may extend from the cavity to trap fluid therein.

It is thus another object of the invention to provide an oven that utilizes steam to prepare the food product, and to provide a closed food preparation system.

In another aspect, the oven includes a pair of independently controlled oven chambers defining a pair of corresponding heating cavities.

It is thus another object of the invention to provide greater flexibility to the food preparation efforts of the chef.

In one preferred form, each oven chamber has a first door and a second door both providing access to the heating cavities.

It is thus another object of the invention to provide a pass-through design for both oven cavities.

Methods for using these ovens are also disclosed.

These and other aspects of the invention are not intended to define the scope of the invention for which purpose claims are provided. In the following description, reference is made to the accompanying drawings, which form a part hereof, and in which there is shown by way of illustration, and not limitation, preferred embodiments of the invention. Such embodiments do not define the scope of the invention and reference must be made therefore to the claims for this purpose.

BRIEF DESCRIPTION OF THE DRAWINGS

Reference is hereby made to the following figures in which like reference numerals correspond to like elements throughout, and in which:

FIG. 2 is an elevation view of a second end of the oven illustrated in FIG. 1 also allowing access to the heating cavity for the removal of prepared food product therefrom;

FIG. 3 is a sectional view of the oven taken along line 3—3 of FIG. 1;

FIG. 4 is a top plan view of the oven illustrated in FIG. 1 mounted in a kitchen wall in accordance with an alternate embodiment of the invention; and FIG. 5 is an elevation view of a first end of a stacked oven constructed in accordance with an alternate embodiment of the invention.

DETAILED DESCRIPTION OF THE PREFERRED EMBODIMENT

Figure 1:
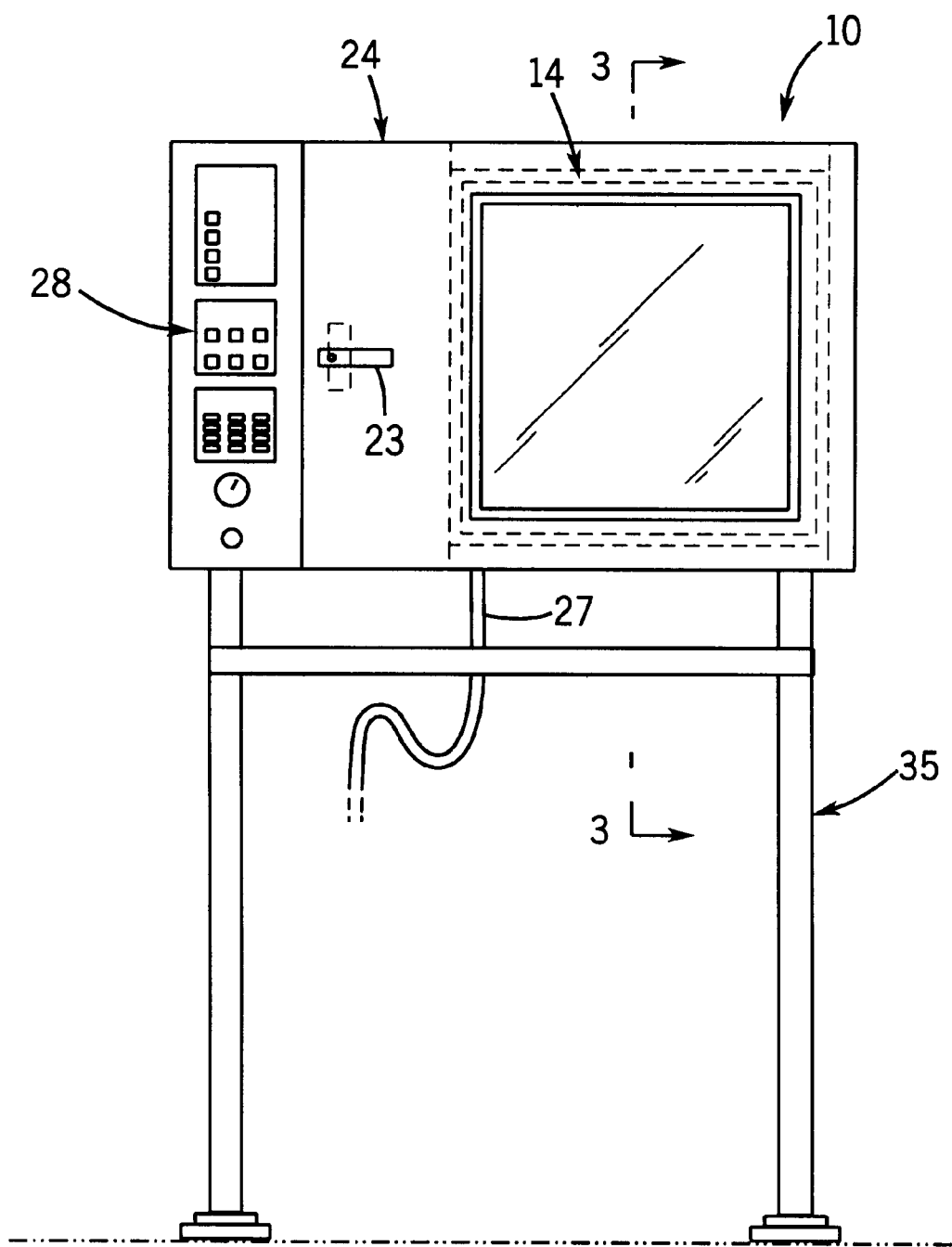
FIG. 1 is an elevation view of a first end of an oven allowing access to the heating cavity for the delivery of raw food product thereto in accordance with a preferred embodiment of the invention.

Referring initially to FIGS. 1–3, a commercial oven 10 includes a heating cavity 12 that is defined by a generally rectangular oven chamber 14. The chamber 14 is defined by side walls 16 and 18, upper and lower walls 20 and 22, and front and rear doors 24 and 26. A plurality of racks 25 extends laterally between side walls 16 and 18 and allows for the delivery of raw food product into the cavity to be supported on the racks, and removal of prepared food product from the racks. The doors 24 and 26 may be opened and closed by a traditional handle 23. Advantageously, doors 24 and 26 swivel between a closed and open position to render the cavity 14 accessible from separate sides of the oven 10, thus providing a pass-through design as will be described in more detail below.

In accordance with the preferred embodiment, oven 10 is a Combitherm® oven and/or steamer, commercially available from Alto-Shaam, Inc. located in Menomomee Falls, Wis. Such devices are available in several models having cooking elements that may include electric coils or gas burners disposed within the cavity to prepare the food product via convection. Additionally, the oven 10 may include a cooking element that is be configured to receive a water supply, and evaporate the water to produce a steam that is introduced into cavity 12 to prepare steamed food product (e.g. vegetables) therein. In this regard, it should be appreciated that the oven 10 may prepare food via convection, steam, or a combination of both.

Oven 10 may further comprise a drain 27 for expelling excess moisture, particularly when utilizing the oven 10 as a steamer. In particular, the drain 27 comprises a tube that extends from the bottom of the oven 10 to remove excess moisture from the cavity 12. In conventional ovens, the drain provides an outlet for the flavored air to escape from the heating cavity. Advantageously, the tube 27 of oven 10 is U-shaped to collect moisture at the bottom of the "U," thereby preventing the escape of gas from the cavity 12. A closed food preparation system is thus provided that utilizes an isolated cooking cavity 12 to capture and preserve the flavor of the food product.

It should be appreciated, however, that oven 10 could alternatively comprise any device operable to prepare food by means of convection (gas or electric), steam, or a combination of both in accordance with the present invention. The present invention is particularly applicable to commercial ovens, whereby a chef is responsible for the preparation of raw food product and a serving staff is responsible for removal of prepared food product.

The oven 10 includes standard operating controls 28 on the chef side that include, among others, a timer and temperature control to operate a cooking sequence as understood by one having ordinary skill in the art. A control panel 30, disposed on the server side of oven 10, includes a light 32 and a switch 34. The light 32 indicates that the unit is on and powered. A buzzer 33 may be disposed anywhere such that its sound is within earshot of the chef and serving staff, and is activated only after a cooking sequence has been completed. Accordingly, once the food has been prepared to the chef's satisfaction, the chef activates control 28 to, in turn, actuate the buzzer 33 to indicate that the food product is ready to be removed from cavity 12. The buzzer 33 may otherwise be activated automatically upon the termination of a predetermined cooking sequence. In accordance with an alternate embodiment, the chef could illuminate a visible indicator instead of, or in combination with, the buzzer 33 to alert the serving staff that the prepared food product is ready to be removed.

Once the buzzer 33 is sounded, the server approaches the oven 10 at a remote location from the chef and cancels the buzzer by flipping the switch 34 to acknowledge that the prepared food product may be, or has been, removed from cavity 12. Advantageously, the switch 34 is not easily accessible to the chef, thereby further minimizing that the prepared food product will be indirectly contaminated by raw food product. In particular, the server accesses the heating cavity 12 via server-side door 26 to remove the prepared food product. In accordance with an alternate embodiment, the server-side door 26 may be automatically locked in the closed position until the buzzer 33 has sounded and has been de-activated by the server.

Advantageously, doors 24 and 26 and controls 28 and 32 are isolated such that the chef, who routinely handles raw meat product, will not come into contact with prepared food product either directly or indirectly (e.g. via the door or controls). As another advantage, a server-side door that is located remotely from the chef alleviates a frequently cramped situation in commercial kitchens that otherwise could hinder the chef's food preparation efforts.

In accordance with the preferred embodiment, the chef-side door 24 is located at the front of the unit, and the server-side door 26 is disposed at the rear of the unit. This design allows chefs to prepare the food using the main control 28 and door 24 to cook the food, and allows servers to access the contents from the other side. It should be appreciated that the second door 26 may alternatively be located anywhere on the device, so long as it allows the serving staff to access the final food product without interfering with the chef's activities, and so long as it sufficiently isolates the final food product from contaminants associated with raw food product. For example, door 26 may be disposed on a wall that is adjacent the wall that houses door 24. Alternatively, door 26 may be disposed on the same wall as door 24 if, for example, the oven is built into a kitchen wall. Because unprepared food product is placed in the chamber at the first access location, and is removed at the second access location, the oven is said to possess a pass-through design.

As illustrated in FIGS. 1–3, the oven 10 may be mounted onto a support stand 35 that is connected to the kitchen floor. Alternatively, as illustrated in FIG. 4, the oven 10 may further be mounted within a kitchen wall 37 such that the chef-side door 24 is located at one side of the wall, while the server-side door 26 is located on the other side to further isolate the chef from the serving staff.

Referring now to FIG. 5, a pair of ovens 10 are stacked vertically to provide enhanced food preparation flexibility to the chef. Both ovens 10 may incorporate the pass-through design in accordance with the present invention and may either be supported by the stand 35 illustrated, or mounted directly into the kitchen wall 37.

INDUSTRIAL APPLICABILITY

The invention provides a pass-through design for ovens.

The invention has been described in connection with what are presently considered to be the most practical and preferred embodiments. However, the present invention has been presented by way of illustration and is not intended to be limited to the disclosed embodiments. Accordingly, those skilled in the art will realize that the invention is intended to encompass all modifications and alternative arrangements included within the spirit and scope of the invention, as set forth by the appended claims.

I claim:

1. A pass-through oven, comprising:
   an oven chamber defining a heating cavity that is configured to receive raw food product therein and utilize cooking elements to produce prepared food product from the raw food product;
   a chef-side access assembly including a first door disposed at a chef-side location of the oven, the first door providing access to the cavity for inserting the raw food product therein;
   a server-side access assembly including a single second door disposed at a server-side location remote from the chef-side location, the second door providing access to the cavity for the removal of the prepared food product therefrom; and
   a set of controls disposed proximal the chef-side location to control the cooking elements; and
   an indicator that is activated when the prepared food product is ready to be removed from the cavity via the second door wherein the indicator is disposed at a location other than the chef-side location.

2. The oven as recited in claim 1, wherein the server-side access assembly consists of a single second door.

3. The oven as recited in claim 1, wherein the indicator is activated by the set of controls.

4. The oven as recited in claim 1, wherein the indicator is activated manually.

5. The oven as recited in claim 3, wherein the indicator is activated automatically upon the completion of a cooking sequence.

6. The oven as recited in claim 1, further comprising a switch located remotely from the first door and operable to deactivate the indicator once the prepared food product has been removed from the cavity.

7. The oven as recited in claim 1, wherein the second door is automatically locked in a closed position until the indicator has been actuated.

8. The oven as recited in claim 1, wherein the indicator is a visible indicator.

9. The oven as recited in claim 1, wherein the indicator is an audible indicator.

10. The oven as recited in claim 1, wherein the first and second doors are located on opposing walls.

11. The oven as recited in claim 1, wherein the first and second doors are located on adjacent walls.

12. The oven as recited in claim 1, wherein the first and second doors are located on the same wall.

13. The oven as recited in claim 1, wherein the cooking elements produce steam to prepare the raw food product.

14. The oven as recited in claim 13, further comprising a drain extending from the cavity configured to trap fluid therein to provide a closed food preparation system.

15. The oven as recited in claim 1, wherein the cooking elements use convection to prepare the raw food product.

16. The oven as recited in claim 15, wherein the cooking elements comprise electric cooking elements.

17. The oven as recited in claim 15, wherein the cooking elements comprise gas cooking elements.

18. The oven as recited in claim 1, further comprising a pair of independently controlled oven chambers defining a pair of corresponding heating cavities.

19. The oven as recited in claim 18, wherein each oven chamber has a first door and a second door both providing access to the heating cavities.

20. A method of using an oven of the type having a heating cavity that utilizes cooking elements to produce a prepared food product from a raw food product, a chef-side access assembly including a first door for the insertion of raw food product into the cavity, and a server-side access assembly located remote from the chef-side access assembly and including a second door for the removal of prepared food product from the cavity, the steps comprising:
   (A) inserting raw food product into the cavity via the first door;
   (B) activating the cooking elements via a set of controls disposed proximal the chef-side access assembly;
   (C) activating an indicator when the raw food product has been prepared; and
   (D) in response to the indicator, removing the prepared food product via the second door.

21. The method as recited in claim 20, wherein step (C) further comprises manually activating the indicator.

22. The method as recited in claim 20, wherein step (C) further comprises automatically activating the indicator upon completion of a cooking sequence.

23. The method as recited in claim 20, further comprising deactivating the indicator once the prepared food product has been removed from the cavity.

24. The method as recited in claim 20, further comprising automatically locking the second door in a closed position until the indicator has been actuated.

25. The method as recited in claim 20, wherein the first and second doors are located on opposing walls.

26. The method as recited in claim 20, wherein the first and second doors are located on adjacent walls.

27. The method as recited in claim 20, wherein the first and second doors are located on the same wall.

28. Method of claim 20, wherein the server-side access assembly consists of the second door.

29. Method of claim 20, wherein indicator is located remote from the chef-side access assembly.

* * * * *